(No Model.)
2 Sheets—Sheet 1.
H. M. HILL.
CAR FENDER.
No. 550,615.
Patented Dec. 3, 1895.
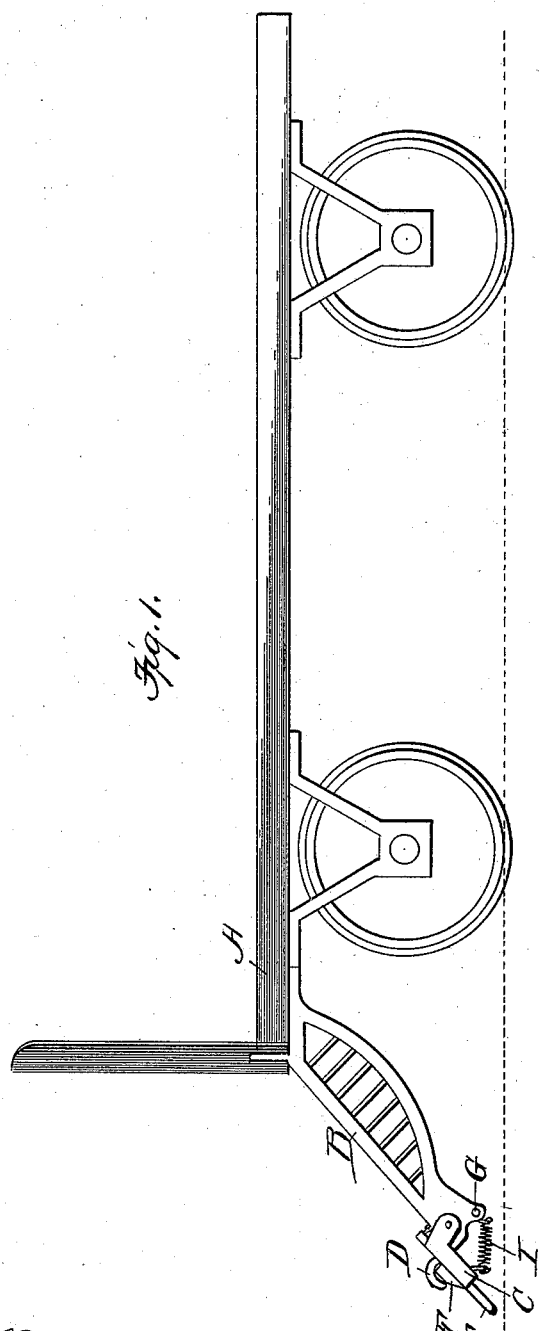
Witnesses
F. R. Cornwall
Hugh K. Wagner
Inventor
Harry M. Hill
by Paul Bakewell
his att.

(No Model.) 2 Sheets—Sheet 2.
H. M. HILL.
CAR FENDER.
No. 550,615. Patented Dec. 3, 1895.
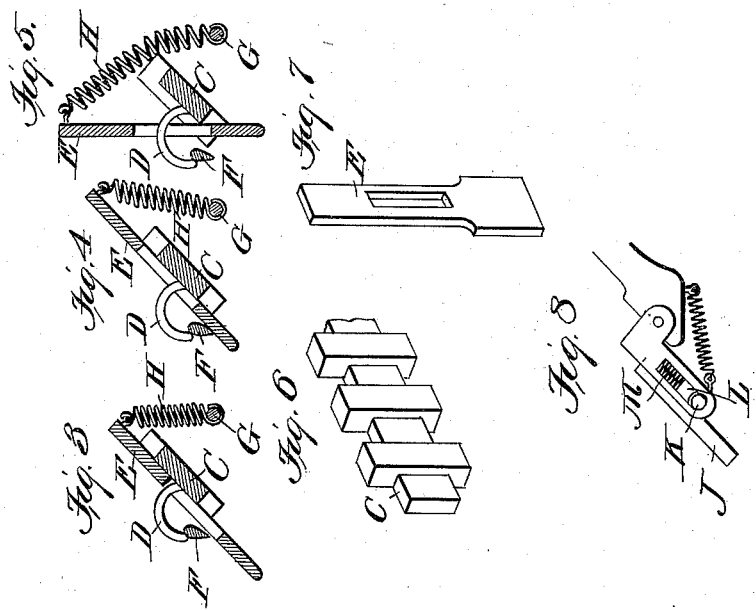
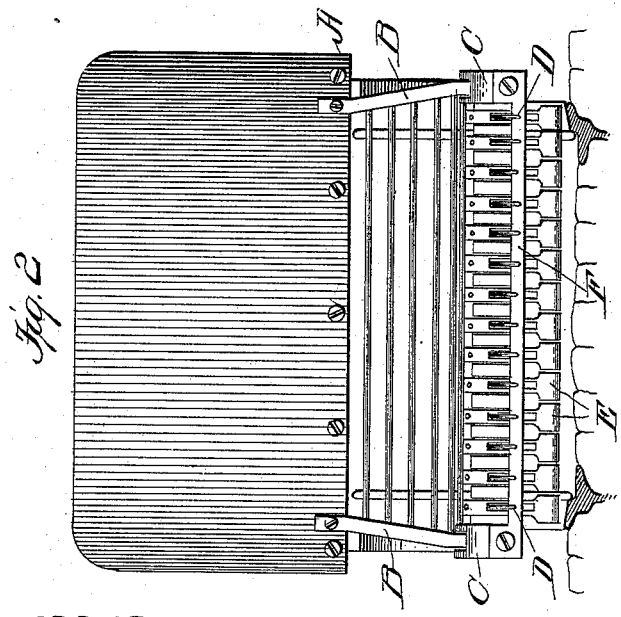
Witnesses:
J. R. Cornwall
Hugh R. Wagner
Inventor
Harry M. Hill
by Paul Bakewell
his atty.

UNITED STATES PATENT OFFICE.

HARRY M. HILL, OF ST. LOUIS, MISSOURI.

CAR-FENDER.

SPECIFICATION forming part of Letters Patent No. 550,615, dated December 3, 1895.

Application filed April 2, 1895. Serial No. 544,152. (No model.)

*To all whom it may concern:*

Be it known that I, HARRY M. HILL, a citizen of the United States, residing at the city of St. Louis, State of Missouri, have invented a certain new and useful Improvement in Car-Fenders, of which the following is a full, clear, and exact description, reference being had to the accompanying drawings, forming part of this specification, wherein—

Figure 1 is a side elevational view of a car provided with my improved fender. Fig. 2 is a front elevational view. Figs. 3, 4, and 5 are cross-sectional views through the guards, illustrating different positions. Fig. 6 is a detail of the bar upon which the guards are mounted, the curved fingers being omitted. Fig. 7 is a detail of one of the guards. Fig. 8 is a modification.

This invention relates to a new and useful improvement in car-fenders, the object being to construct a fender which is practically unbreakable, self-adjusting, and one which is a safeguard against the car, to which it is attached, running over persons or animals on the track.

With these objects in view the device consists in the construction, arrangement, and combination of parts, all as will hereinafter be described, and afterward pointed out in the claims.

In the drawings, A represents a car, which may be of any ordinary or approved construction. Attached to the front of the car is a basket B, which is formed with two side rails to strengthen the same. Pivoted to the lower front end of the basket is a notched bar C, from which project curved fingers D. Mounted upon this bar C are guards E, which are slotted vertically to permit the curved fingers to pass therethrough. The bar C is preferably formed with projections, which act as spacers for the guards. (See Fig. 6.) Arranged in front of the guards to prevent displacement thereof is a rod F, which extends the length of the bar C. This rod F is preferably thin at its middle portion, as shown by the cross-sections in Figs. 3, 4, and 5, and its ends are broadened, as shown in Figs. 1 and 2, the bar being secured to the ends of bar C by bolts passing through the broadened ends.

G indicates a rod mounted in the basket-frame, which affords a mount for the ends of returning-springs H, whose other ends are connected to the tops of the guards.

I is a spring arranged between the lower edge of bar C and the basket-frame, which spring tends to hold the bar in its normal position. Should it become necessary to back the car and there is an obstruction on the track, these springs I will permit the bar and its guards to swing forward and pass over the obstruction.

The operation of the device as above described is as follows: Should one of the guards strike an obstruction, such as a stone or other obstacle of like nature, it will either rise, as shown in Fig. 4, if the obstruction present an inclined surface, or rise and swing backwardly, as shown in Fig. 5. In order to raise the guard so that its lower edge will swing in substantially a horizontal plane, the upper edge of the slot rides upon the curved fingers D in the forward movement of the upper end of the guard, thus preventing the lower ends of the guards from moving in an arc of a circle, which would carry the lower edges to a lower plane. When the guards swing back, they fulcrum on the lower forward edge of the bar C and are returned to their normal positions by the springs H. The spacers which project from the bar C prevent lateral movement of the guards.

In Fig. 8 I have shown a modified form of fender, in which the guard J is in the form of a solid rail mounted upon a rod K, which is journaled in slots in the fender-frame. A torsion or other spring or springs are arranged around the rod and tend to hold the rail in its normal inclined position. Bearing-blocks L are arranged in the slots above the rod, and springs M are located in the slots above the blocks. By this construction the guard-rail can move upwardly and backwardly the same as the guards in Figs. 1 to 7.

Should the car lunge forward, the only contacting-point with the ground will be the guards, which will yield without breaking. Should the guards contact with the limbs of persons or animals, they will yield, relieving the limbs of a possible injurious shock, and by the momentum of the car the person or animal will be thrown into the basket out of danger.

Having thus described my invention, what I claim, and desire to secure by Letters Patent, is—

1. The combination with a car fender, of a rod pivoted in the front end thereof, springs for holding said rod in a lowered position, guards which are mounted upon said rod, and springs for holding said guards in a lowered position; substantially as described.

2. The combination with a fender comprising a frame having two side rails converging to a point at the front, a bar pivoted to the forward ends of the frame, a guard fulcrumed on the bar, said guard being movable in a forward, backward, and upward direction, a spring for returning the guard to its normal position on the bar after having been moved upwardly or backwardly, and a spring for returning the guard to its normal position after being moved forwardly; substantially as described.

3. The combination with a fender frame, of a bar pivoted at the forward end of the frame, spacer projections on the bar, guards arranged between the spacers, a rod F, arranged in front of the guards, and springs for returning the guards to their normal positions after actuation; substantially as described.

4. The combination with a bar, of curved fingers D projecting therefrom, guards provided with slots through which the curved fingers pass, and springs for normally holding the guards against the curved fingers; substantially as described.

5. The combination with a bar, of curved fingers D projecting therefrom, guards provided with slots through which the fingers pass, a rod F arranged in front of the guards, for confining them in position, a rod G arranged behind the bar, and springs whose ends are connected to the guards and the rod G; substantially as described.

6. The combination with a car fender, of guards pivoted in front thereof, said guards being susceptible of a backward movement, means for causing the lower edges of the guards to travel in substantially a horizontal plane, while moving backwardly and springs for returning the guards to their normal positions; substantially as described.

In testimony whereof I hereunto affix my signature, in presence of two witnesses, this 28th day of March, 1895.

HARRY M. HILL.

Witnesses:
F. R. CORNWALL,
HUGH K. WAGNER.